United States Patent [19]

Gondek

[11] 4,213,482
[45] Jul. 22, 1980

[54] HYDRAULIC COUPLER

[76] Inventor: John T. Gondek, P.O. Box 21013, Minneapolis, Minn. 55421

[21] Appl. No.: 954,616

[22] Filed: Oct. 25, 1978

Related U.S. Application Data

[63] Continuation of Ser. No. 290,562, Sep. 18, 1972, abandoned, which is a continuation of Ser. No. 101,076, Dec. 23, 1970, abandoned.

[51] Int. Cl.³ ............................................. F16L 37/22
[52] U.S. Cl. .......................... 137/614.01; 137/614.05; 137/614.06; 285/316
[58] Field of Search .................. 285/277, 316; 137/614.03, 614.04, 614.05, 614, 614.01, 614.02; 251/149.1, 149.6, 149.8

[56] References Cited
U.S. PATENT DOCUMENTS

| | | | |
|---|---|---|---|
| 2,860,893 | 11/1958 | Clark | 285/316 |
| 2,913,263 | 11/1959 | Zajac | 285/277 |
| 3,097,867 | 7/1963 | Saloum | 137/614.03 |
| 3,130,749 | 4/1964 | Wittren | 137/614.19 |
| 3,163,178 | 12/1964 | Stratman | 137/614 |
| 3,188,123 | 6/1965 | Hansen | 285/277 |
| 3,530,887 | 9/1970 | Stratman | 137/614.05 |

*Primary Examiner*—Martin P. Schwadron
*Assistant Examiner*—A. Michael Chambers
*Attorney, Agent, or Firm*—Peterson, Palmatier, Sturm & Sjoquist, Ltd.

[57] ABSTRACT

A detachable hydraulic coupler includes a male and female portion each including a valve which closes to prevent leakage when the coupler portions are detached. The valves do not directly contact each other when the coupler is closed, thereby simplifying the closing operation. The section of the female portion enclosing the male portion includes a series of locking balls slidable in apertures and which extend into a groove in the male portion to lock the coupler portions together. A slidable collar encircling the female portion normally holds the locking balls in locking position. The apertures supporting the balls, along with one wall of the groove, are inclined at an acute angle with respect to the relatively slidable cylindrical surfaces formed on the coupler portions so that much of the force tending to urge the locking balls outwardly is resisted by the walls of the various apertures in which the balls reside, thus minimizing the outward component of the force so that the collar may be readily moved into coupler detaching position.

5 Claims, 5 Drawing Figures

HYDRAULIC COUPLER

CROSS-REFERENCE TO RELATED APPLICATION

This is a continuation of my application, Ser. No. 290,562, filed Sept. 18, 1972, now abandoned. Ser. No. 290,562 is a continuation of Ser. No. 101,076, filed Dec. 23, 1970, now abandoned.

BACKGROUND OF THE INVENTION

Various types of hydraulic couplers have been produced for use in hydraulic lines and constructed so that, when the coupler is disconnected, the uncoupled ends of the lines are sealed to prevent the escape of fluid. Valve means are provided to close the ends of the coupled hose. Means are provided for opening these valves when the parts of the coupler are reconnected so that fluid under pressure may again flow through the coupling from one line to the other line.

One of the problems experienced with couplers of this type lies in the fact that the two parts of the coupler are usually difficult to connect and to disconnect so that when the coupled lines are subject to high pressure, it is extremely difficult either to disconnect them or to reconnect them. Couplers of the type in question usually include a male portion which is detachably inserted into a female portion. The female portion may be provided with a series of angularly spaced radially extending holes which accommodate steel balls. In connected position of the two portions, these balls extend into a peripheral groove encircling the male portion. A slidable sleeve is resiliently urged into position to urge these balls inwardly, and to hold these balls from outward movement, and thus to maintain the balls engaged in the groove. The slidable sleeve normally includes an internal peripheral groove at one end thereof so that when the slidable sleeve is moved into disconnect position, the balls may be forced outwardly into the internal groove to permit the two parts or portions of the coupling to be disconnected. The peripheral groove in the male portion of the coupling is provided with a tapered wall so that when the balls are not held from outward movement by the slidable sleeve, a wall at one side of the groove will act as a cam to force the balls outwardly and to permit release of the male portion of the coupler from the female portion thereof.

The problem which has been experienced with couplers of this type lies in the fact that the holes in the female portion of the coupler in which the balls are located are normally formed on an axis normal to the axis of the coupler. As a result, when the coupler is under high hydraulic pressure, the tapered wall of the groove in the male portion of the coupler urges the balls outwardly against the inner cylindrical surface of the slidable sleeve or collar with such force that it may be impossible to manually slide the collar into disconnect position. Normally there is pressure tending to disconnect the two portions of the coupler. When the pressure tending to disconnect the coupling is high, the camming force of the wall of the groove in the male portion exerts sufficient force against the balls so that the slidable collar cannot be moved by hand. As an example, it has been found that a common type of commercial coupler, when placed in a one-half inch inside diameter fluid line, cannot be manually disconnected by most persons where the pressure in the line exceeds 500 lbs. If the hydraulic line is subjected to a higher pressure, the force exerted against the disconnect collar which is frictionally engaged by the balls is sufficient to lock the collar from manual slidable movement into disconnect position.

A further difficulty with couplers of this type lies in the fact that when the two parts or portions of the coupler are reconnected, it is difficult to telescope the male and female parts into interlocked position due to the fact that the valve means closing the ends of the two lines must be forced into an open position as the parts of the coupler are connected. If the parts of the line are under high pressure, the valve means closing the ends of the two coupler portions are urged into closing position with such force that it is difficult or impossible to manually reconnect the parts of the coupler.

SUMMARY OF THE INVENTION

This invention relates to an improvement in hydraulic couplers and deals particularly with a coupler which may be used in hydraulic hose lines subjected to high hydraulic pressure but which lines may be readily disconnected while the lines are under pressure, and which may also be reconnected without reducing the hydraulic pressure, the ends of the coupled lines being sealed to prevent the escape of the high pressure fluid.

An object of the present invention resides in the provision of a construction which eliminates the previous difficulties mentioned. The balls which hold the coupler assembled are mounted in holes or passages in the female portions of the coupler which are angularly related with respect to a plane normal to the axis of the coupler, so that the force tending to detach the male portion of the coupler from the female portion thereof is exerted against the wall of the passage in the female portion of the coupler rather than directly against the disconnect collar. The force tending to disconnect the two parts of the coupler is accordingly transmitted through the angularly spaced balls from the wall of the groove in the male portion of the coupler to the wall of the aperture in which each ball is positioned. As a result, the radial force tending to urge the balls against the disconnect collar is greatly reduced or virtually eliminated so that the disconnect collar may be readily manually moved into disconnect position.

In the past it has been common practice for the balls locking the two portions of the coupler together to engage a cylindrical bore in the disconnect sleeve. This cylindrical bore terminates in a shoulder which connects the bore with a second bore of increased diameter. The second bore comprises the inner peripheral groove previously referred to. When the balls are positioned in the bore of increased diameter, the male portion of the coupler is released, or the balls are moved outwardly of the periphery of this male portion of the coupler. In the present construction, the disconnect sleeve is provided with a slight taper which permits the gradual outward movement of the balls as the collar is moved in an axial disconnect direction. The outward component of the force urging the balls outwardly permits a gradual outward movement of the balls until the two portions of the coupler are disconnected. This outward movement or cam action helps to move the sleeve to the disconnect position.

A further feature of the present invention resides in the fact that the valves which close the two portions of the coupler when the coupler is open or disconnected are out of contact when the coupler is connected. A spring urges each valve element against or toward a seat at the end of the coupler portion in which it is positioned. In preferred form, the valve closing the female portion of the coupler is provided with a spring which is stronger than the previously mentioned springs, or which requires more force to compress than the other springs. This third spring tends to urge the valves apart and is responsible for opening the coupler after the two parts of the coupler have been engaged when the proper relative hydraulic forces exist in the lines.

BRIEF DESCRIPTION OF THE PREFERRED EMBODIMENT

Figure 1:
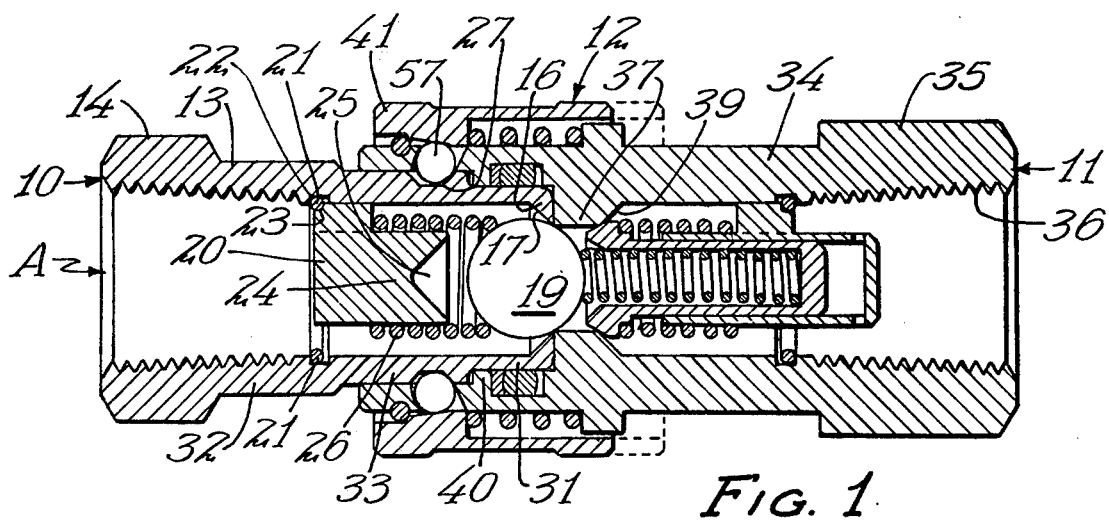
FIG. 1 is a sectional view through the coupler showing both ends of the coupler in sealed position with pressure in both lines.
Figure 2:
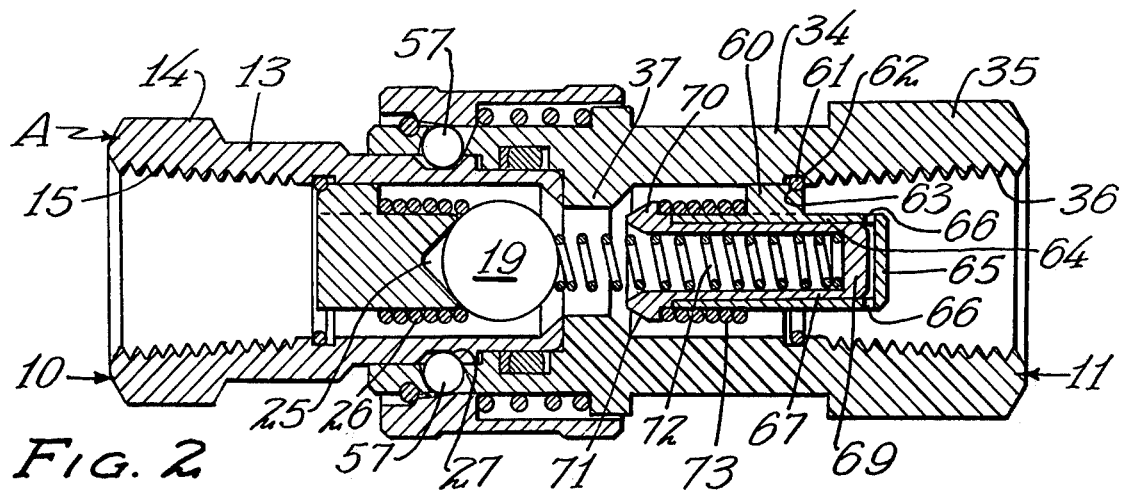
FIG. 2 is a sectional view similar to FIG. 1, but showing the coupler valves in open flow position.
Figure 3:
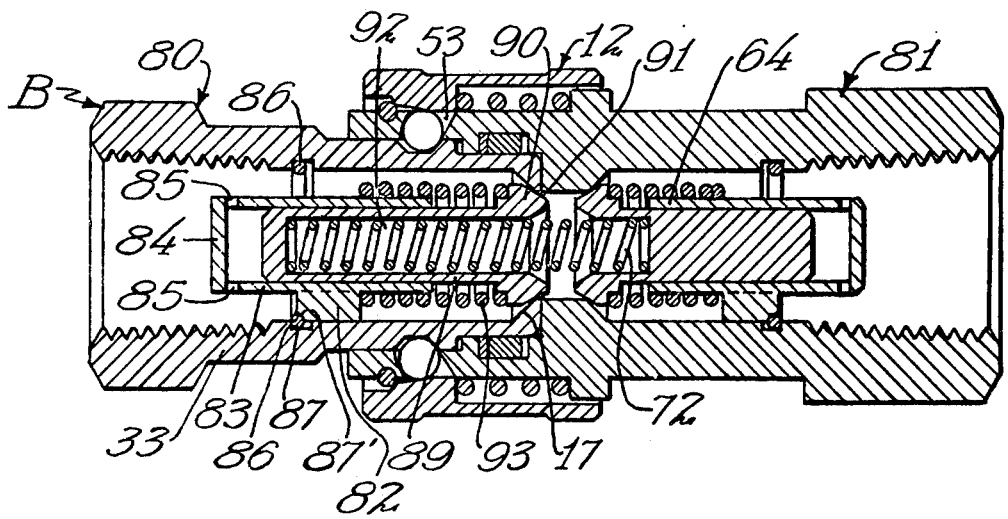
FIG. 3 is a view similar to FIG. 1 but showing similar valves in each of the two portions of the coupler with pressure in both lines.

The coupler A is illustrated in FIG. 1 of the drawings with its valves in closed position, there being pressure in both lines. In FIG. 2 of the drawings the valves are in open position. The coupler A is quite similar in general appearance to couplers which have been produced for a number of years. The coupler A includes a male portion 10 and a female portion 11 which are designed to interfit in the manner which will be described. A locking collar or sleeve 12 is slidably supported upon the female portion 11 for movement between the position shown in solid outline and the position shown in dotted outline in FIG. 1 in the manner which will also be described.

The male coupler portion 10 comprises an elongated sleevelike body 13 having an enlarged outer diameter end 14 which is multisided or normally hexagonal so that it may be rotated for connection with the hose fitting which is not illustrated in the drawings. The outer end of the male portion 10 is internally threaded as indicated at 15. An inwardly extending flange 16 is provided at the opposite or inner end of the portion 10. This flange 16 is provided with a tapered surface 17 which may act as a seat for a ball valve 19.

A spider 20 which has openings to allow the passage of fluid is provided within the sleevelike body 13, and is locked from outward axial movement by a locking ring 21 engageable in a groove 22 in the inner surface of the body 13, and in a notch or chamfer 23 at the end of the spider. The spider 20 is provided with a coaxial boss 24 having a generally concial axial socket or recess 25 in its inner end or in the end facing the ball valve 19. A spring 26 encircles the boss 24 and engages the ball valve 19 to urge it against the tapered seat 17 on the flange 16.

Figure 4:
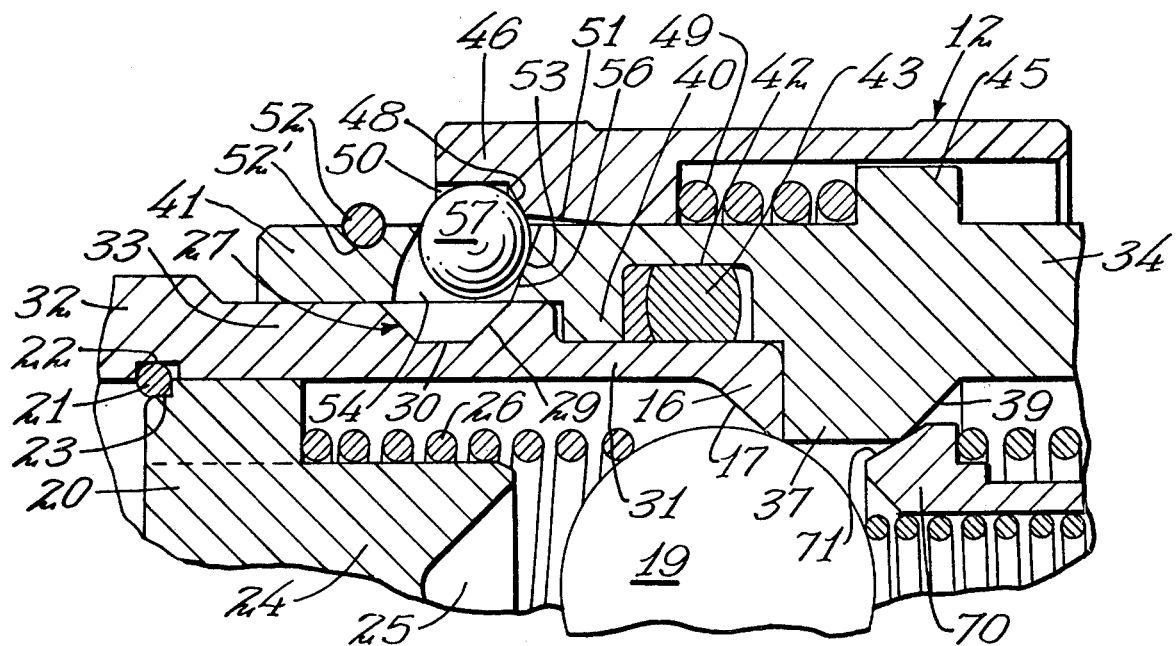
FIG. 4 is an enlarged fragmentary detail of the structure shown in FIG. 1, the view showing the locking collar released.

The sleevelike body 13 is provided with a peripheral groove 27 in its exterior surface, the groove 27 having at least one inclined wall 29 (best viewed in FIGS. 4 and 5) which inclines from the base 30 of the groove in an outward direction and toward the flange 16 of the inner end of the body 13. The inclined groove wall 29 is at an angle of approximately 45 degrees to a plane normal to the axis of the coupler, as a specific example.

The portion of the sleeve body 13 adjoining the flanged end 16 includes a reduced diameter portion 31 as illustrated. Actually, the body 13 includes an outer portion 32 of relatively large diameter adjoining the multisided portion 14, an intermediate portion 33 of an intermediate diameter, and the above-mentioned smaller diameter inner end portion 31. The groove 27 is in the intermediate portion 33.

The female portion 11 of the coupler also comprises a sleevelike body 34 shown as including a multisided or hexagonal outer end portion 35. The outer end portion of the body 34 is internally threaded as indicated at 36. A ring-shaped internally extending flange 37 is provided intermediate the ends of the sleevelike body 34. The flange 37 is provided with a tapered outer surface 39. The interior of the body 34 is also provided with a shoulder 40 which snugly accommodates the reduced diameter portion 31 of the male coupler portion, and an end portion 41 having a somewhat larger interior diameter to snugly encircle the intermediate portion 33 of the male portion 10 of the coupler. The inner surface of the shoulder 40 is provided with a groove 42 which accommodates a sealing ring 43 so as to prevent leakage between the two portions of the coupler when the coupler is connected.

The body is provided with a peripheral flange 45. The locking sleeve or collar 12 is provided with an internal flange 46 which slidably encircles the inner end portion 41 of the body 34 and is slidable relative thereto. The outer end of the sleeve 12 is of larger diameter, and slidably encircles the cylindrical flange 45. A spring 49 is interposed between the flange 45 and the internal flange 46 to urge the sleeve or collar 12 to the left or toward the inner end of the coupler body 34.

Figure 5:
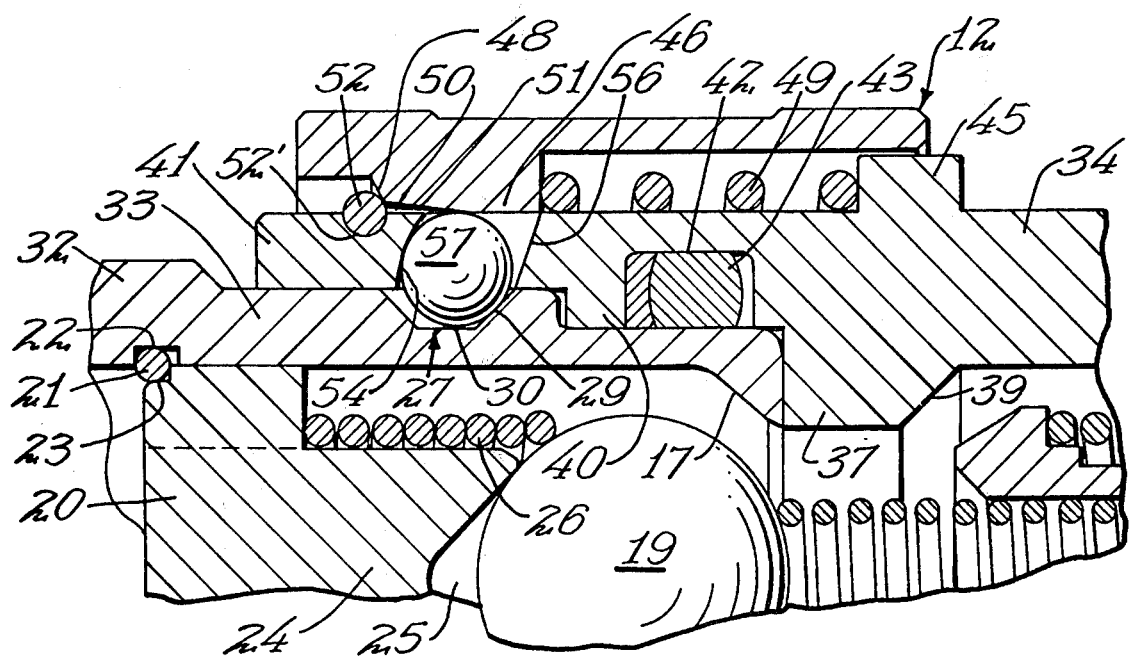
FIG. 5 is an enlarged fragmentary detail of the structure shown in FIG. 2.

The inner end 50 of the sleeve 12, or the end of the sleeve which is closest to the male coupler portion 10, is provided with a slightly tapered inner surface 51; the taper of the surface 51 relative to a line parallel to the axis of the coupler is preferably approximately four degrees. A locking ring 52 is seated in an external groove 52' in the coupler body 34 and engages a chamfer 48 at the end 50 of the sleeve 12 to limit the movement of the sleeve to the left as indicated in FIGS. 1 and 5 of the drawings. A series of inclined apertures 53 extend through the portion of the body 34 which encircles the intermediate diameter portion 33 of the male coupler portion 10. The apertures 53 may be tapered throughout their length, or may include a smaller diameter inner end portion 54 which serves as a ball retaining means. The apertures 53 incline outwardly and toward the outer internally threaded end of the body 34 and have their axes at an angle of approximately 30 degrees to a plane normal to the axis of the coupler. This is evident from FIGS. 4 and 5. As previously stated herein and as also evident from FIGS. 4 and 5, the wall 29 inclines at an angle of approximately 45 degrees with respect to the axis of the coupler. As a result, the wall, such as 56, of each aperture 53 is at an angle of approximately 15 degrees with respect to the wall 29 of the groove 27 of the male portion 10 of the coupler.

Locking balls 57 are slidably supported in the apertures 53. When the sleeve or collar 12 is in the position indicated in FIG. 1 of the drawings, the locking balls 57 are held engaged in the groove 27, preventing the separation of the two coupler portions 10 and 11. However, when the collar or sleeve 12 is retracted toward the right to the position shown in FIG. 4 of the drawings, the balls 57 may be urged into position to be disengaged from the male coupler portion 10, permitting the coupler to be disconnected.

A spider 60 is supported within the bore of the body 34 and is held in place by a locking ring 61 engaged in a groove 62 in the inner surface of the body 34 and a notch or chamfer 63 in the radially extending legs of the spider or may be held by threads. The spider 60 includes a concentric sleeve 64 extending axially in both directions from the radially extending legs of the spider, and preferably terminates in an end closure 65 at one end. The interior of the sleeve 64 adjoining the closure 65 is connected to the exterior thereof by suitable equalizing openings 66. A valve plunger 67 having a closed outer end 69 is slidably supported in the sleeve 64. The valve plunger 67 supports a valve head 70 having a tapered outer surface 71 which is engageable against the tapered outer surface 39 at the right of the flange 37 which surface 39 forms a seat for the valve head 70.

A spring 72 is positioned within the hollow valve plunger 67, and projects axially from the valve head 70 into position to engage the ball valve 19. A spring 73 encircles the inwardly extending end portion of the sleeve 64 and engages the outer end of the valve head 70 to normally urge the valve head 70 into engagement with its seat 39. The springs 26 and 73 are of similar compressive resistance so that the valve ball 19 and valve head 70 are urged against their respective seats 17 and 39 with substantially equal pressure. The spring 72 is of greater compressive strength than either of the springs 26 and 73 and extends between the closed end 69 of the valve plunger 67 and the ball 19, tending to urge the valve ball 19 into open position, that is away from its seat 17.

From the foregoing description, it will be seen that a coupler is provided which may be readily disengaged even though the interior of the line is subject to high pressure. The slant of the walls 56 of the angularly spaced apertures 53 is such that each resisting wall 56 is almost parallel to the groove wall 29 which serves to cam the locking balls 57 into open position. As a result, the pressure within the coupler tends to urge the locking balls 57 against the generally parallel walls 56 of the apertures 53, with only a slight component force being exerted outwardly against the inner surface of the sleeve 12. As a result, the locking sleeve or collar 12 may be moved axially with comparative ease. Furthermore, the outer surface of the locking balls 57 normally engage the slightly tapered inner surface 51 which also decreases the pressure required to move the sleeve in an axial direction to disconnect or reconnect the coupler.

The coupler may also be engaged with relative ease, as the two valves in the male and female portions 10 and 11, respectively, of the coupler are not engaged with one another as the coupler is connected. In connecting the coupler, the collar or sleeve 12 is of assistance due to the slightly tapered inner surface 51. As the two parts of the coupler are forced together, the outwardly projecting end of the inner spring 72 engages the valve ball 19 tending to urge this valve ball from its seat 17, and simultaneously tending to retract the valve head 70 from its seat 39.

The male portion 10 of the coupler is normally connected to the fluid source so that fluid normally flows through the coupler from the male portion 10 to the female portion thereof. When the coupler is connected, the pressure in the male coupler portion 10 is reduced momentarily, so that the spring 72 may force the valve 70 from its tapered seat 39. Pressure is therefore equalized on both sides of this valve 70. When the pressure to the female portion 11 of the coupler is increased, pressure on opposite sides of the valve head 70 is equalized, and the spring 72 urges the valve ball 19 into open position, that is, into the socket 25. Fluid may then flow freely through the coupler.

The modified form of construction of the present invention is indicated in general by the letter B. The hydraulic coupler B includes a male portion which is indicated in general by the numeral 80, and a female portion which is indicated in general by the numeral 81. In view of the fact that the female portion 81 is identical to the female portion 11 previously described, the same identifying numerals have been used. The sleeve or collar 12 of the connector B is identical with the collar described in FIGS. 1 and 2, and has accordingly been given the same identifying numerals. The male portion 80 of the valve coupler B is also identical to the male portion 10 which has been previously described, and similar identifying numerals have been used. The difference between the couplers A and B lies in the structure enclosed within the male portion 10, and accordingly this portion will be described in detail. In general, the coupler A includes a ball valve 19 in the male portion 10 thereof and a plunger valve 67 in the female portion 11 thereof. The coupler B differs from the coupler A in including two plunger valves, one of which is located in the male portion 80 of the coupler and takes the place of the valve ball 19.

A spider 82 is provided within the intermediate portion 33 of the male valve portion 80 and supports an axially extending sleeve 83 which is aligned with the sleeve 64 in the female portion 81. The sleeve 83 extends axially in both directions from the supporting spider 82, and terminates in a closed end 84. Pressure equalizing passages 85 extend through the sleeve 83 near the end closure 84. The spider 82 is held in the intermediate portion 33 of the male section 80 by a locking ring 86 engaging in a groove 87 in the inner wall surface of the body 13 and engages against a notch or chamfer 87' in the outer end of the spider 82.

The sleeve 83 slidably supports a plunger valve 89 having a valve head 90 provided with a tapered valve surface 91 which is engageable against the tapered surface 17 of the flange 16. The valve head 90 is axially socketed as indicated at 92 to receive the end of the spring 72. A spring 93 encircles the inwardly extending end of the sleeve 83 and extends between the spider 82 and the valve head 90 to urge the valve towards closed position.

As in the previous arrangement, the operation of the coupler B is similar to that of the coupler A. When it is desired to disconnect the coupler B while it is subject to fluid pressure with the pressure source normally connected to the male portion 80 of the coupler, the sleeve 12 is moved to the right against the force of the spring 49. The locking balls 57 are gradually forced outwardly by the radial component of the force directed against each ball by the wall 29 of the groove 27. When the locking balls 57 are disengaged from the groove 27, the coupler may be pulled apart. As the male portion 80 is moved to the left, the force of the spring 93, coupled with the hydraulic force of fluid within the male portion 80 of coupler B acts to seal the valve head 90 against the tapered seat 17. This is also assisted by the fact that movement of the male portion 80 to the left tends to decrease the tension of the spring 72 against the closed end of the valve plunger 89. Simultaneously, the spring 73, coupled with hydraulic force within the female portion 81 of the coupler B, tends to close the valve plunger 67.

The coupler can be readily connected, as the only main force tending to prevent the recoupling action is the force of the spring 72. A fluid flow may be resumed by momentarily lowering the pressure in the male portion 80 of the coupler B so that the spring 72 tends to open the valve plunger 89. This equalizes the hydraulic force on opposite sides of the plunger 89, and the spring 72 will open the male portion 80 of the coupler by moving the tapered surface 91 of the valve head 90 away from, that is to the left, the seat 17. Fluid pressure against the valve plunger 67 and the female portion 81 of the coupler B will act to open the coupler B to permit a free flow of fluid.

The axes of the apertures 53 are on a common conical plane concentric with the axes of the male and female portions 80 and 81. The aperture wall 56 of each aperture 53 and the inclined groove wall 29 of the groove 27 are on conical planes differing by substantially fifteen degrees. Thus while the locking balls 57 are urged outwardly, most of this force is exerted against the aperture walls 56 of the various apertures 53.

I claim:

1. A detachable hydraulic coupler including:
   a male portion and a cooperable female portion, said male portion being engaged with a free end extremity of said female portion when said coupler is in a coupled position,
   a valve in each of said portions,
   means normally urging said valves toward closed position, a plurality of angularly spaced apertures in said female portion encircling said male portion,
   a locking ball in each of said apertures,
   said male portion having a groove in its outer surface into which said locking balls may extend to hold said male and female portions engaged,
   a collar encircling said female portion and slidably suported thereby for movement between two extreme positions,
   said collar in one extreme position holding said locking balls engaged in said groove in said male portion,
   said apertures having their axes extending at an acute angle with respect to the axis of said coupler, said angle in each instance inclining outwardly and away from said end extremity of said female portion,
   said groove having a wall extending at substantially fifteen degrees with respect to the axes of said apertures and said apertures each having a side extending at said acute angle and said balls being disposed between said groove wall and said sides of said apertures when said coupler is in said couple position.

2. The structure of claim 1 in which the inner surface of said collar outwardly of said locking balls is slightly tapered.

3. The structure of claim 2 in which the degree of taper is substantially four degrees from the axis of the coupler.

4. A detachable hydraulic coupler including:
   a male portion and a cooperable female portion, said male portion being engaged with a free end extremity of said female portion when said coupler is in a coupled position,
   said male and female portions having outer and inner cylindrical surfaces, respectively, which are substantially parallel and in close relation when said portions are connected, said female portion also having an outer cylindrical surface,
   a valve in each of said portions,
   resilient means urging said valves toward closed position,
   resilient means between said valves urging said valves apart under no pressure conditions,
   a plurality of angularly spaced apertures in the portion of said female portion encircling said surfaces,
   a locking ball in each of said apertures,
   a circumferential groove in the outer cylindrical surface of said male portion into which said locking balls may extend to hold said male and female portions engaged,
   a collar having an inner cylindrical surface encircling the outer cylindrical surface of said female portion and slidably supported for axial movement along said outer cylindrical surface of said female portion, between two extreme positions,
   said collar in one extreme position holding said locking balls engaged in said groove in said male portion,
   said apertures having their central axes on a common conical plane at substantially thirty degrees with said cylindrical surfaces and inclining outwardly and away from the end extremity of said female portion, the axes of said apertures being inclined relative to said cylindrical surfaces,
   said groove having a wall on a substantially conical plane at substantially fifteen degrees to said first-mentioned conical plane and said apertures each having a side extending at said substantially thirty degrees with said cylindrical surfaces and said balls being disposed between said groove wall and said sides of said apertures when said coupler is in said coupled position,
   said collar including an integral groove registrable with said locking balls in the other of said extreme positions and the inner surface of said collar being tapered outwardly from said inner cylindrical surface of said collar toward said internal groove at an angle of substantially four degrees with respect to the inner cylindrical surface of said collar and in engagement with said balls in said one position.

5. The structure of claim 4 and in which the resilient means urging said valves toward open position is greater than the force of said means urging said valves toward closed position.

* * * * *